US005626479A

United States Patent [19]

Hughes

[11] Patent Number: 5,626,479

[45] Date of Patent: May 6, 1997

[54] UNIFIED CONNECTOR INTERFACE ADAPTER

[76] Inventor: Michael T. Hughes, 5865 The Twelfth Fairway, Suwanee, Ga. 30174

[21] Appl. No.: 454,508

[22] Filed: May 30, 1995

Related U.S. Application Data

[63] Continuation-in-part of Ser. No. 302,447, Sep. 12, 1994, which is a continuation-in-part of Ser. No. 91,927, Jul. 16, 1993, Pat. No. 5,443,389.

[51] Int. Cl.[6] .......... H01R 23/02

[52] U.S. Cl. .......... 439/35; 439/651; 439/620

[58] Field of Search .......... 439/35, 651, 654, 439/650, 620, 76.1

[56] References Cited

U.S. PATENT DOCUMENTS

| | | | |
|---|---|---|---|
| 1,790,636 | 1/1931 | Hollidter | 439/651 |
| 3,629,789 | 12/1971 | Szeremy | 439/651 |
| 4,218,110 | 8/1980 | Giannaula et al. | 439/651 |
| 4,415,217 | 11/1983 | Clabburn et al. | 439/651 |
| 4,618,196 | 10/1986 | Muzslay | 439/654 |
| 4,938,718 | 7/1990 | Guendel | 439/680 |
| 5,244,409 | 9/1993 | Guss, III et al. | 439/490 |
| 5,320,560 | 6/1994 | Fladung | 439/490 |
| 5,376,757 | 12/1994 | Marsh et al. | 439/651 |

*Primary Examiner*—Gary F. Paumen

[57] ABSTRACT

A unified connector interface adapter apparatus which is adapted to provide electrical connection with any one of a plurality of towing vehicle round wiring harness receptacles. The unified connector interface adapter apparatus has a housing at the second end adapted for securement within a towing vehicle trailer harness receptacle located near the rear of a towing vehicle. The unified connector interface adapter apparatus is adapted at first end to receive a selected round towed vehicle plug having a plurality of connectors extending from the towed vehicle wiring harness. The unified connector interface adapter apparatus is also adapted to provide an interface between complimentary round and non-complementary connectors between a towing and towed vehicle. The housing may also be sized to receive a circuit board therein, which aligns the connectors on the first end with the appropriate connectors on the second end. Said circuit board may also electrically interconnect said connectors with circuit breakers and/or diagnostic visual illuminators.

5 Claims, 3 Drawing Sheets

UNIFIED CONNECTOR INTERFACE ADAPTER

This application is a Continuation-In-Part of application Ser. No. 08/302,447 filed Sep. 12 1994, which is a Continuation-In-Part of application Ser. No. 08/091,927 filed Jul. 16 1993, now U.S. Pat. No. 5,443,389 issued Aug. 22 1995, and are incorporated by reference.

BACKGROUND OF THE INVENTION

1. Field of the Invention

The present invention relates to a connector for releasable securing electrical connectors between separate vehicles, and more particularly to a unified connector interface adapter apparatus adapted for securement to the rear of a towing vehicle, one end of the unified connector interface adapter to mate with a round towing vehicle plug receptacle configured with five or more electrical connectors, and the opposite end of the unified connector interface adapted for connection with a round vehicle plug extending from a towed vehicle with four or more, electrical connectors.

2. Background of the Invention

In recent years, the rising popularity of outdoor recreational activities, such as boating and camping, has led to an increase in the use of trailers, campers, and other towed vehicles. Moreover, many state and federal laws require that towed vehicles have on-board electrical systems for providing brake lights, turn signals, etc. These on-board electrical systems are usually controlled by the electrical systems of the towing vehicle. For example, when the brake lights on the towing vehicle are energized, the brake lights on the towed vehicle are also energized. This is also true for the turn signals, backup lights, etc.

Generally, a hard-wired electrical connection is installed to connect the electrical signals generated on the towing vehicle with responsive electrical signals on the towed vehicle. Hard-wired electrical connections typically include a plurality of mating plug and receptacle connections to enable the user to releasable secure the electrical connection, so that the vehicles may be easily separated when they are not joined together.

Typically, each vehicle includes a wiring harness, to which the mating plug and receptacle connections are secured. Each wiring harness includes a harness connector with male and/or female terminals in a pin and/or blade configuration in order to establish a releasable electrical interconnection between the wiring harness receptacle on the towing vehicle with the wiring harness plug on the towed vehicle.

The towed vehicle typically employs a wiring harness plug having an array of female pin or blade receptacles for releasable insertion with a complimentary array of male pin terminals within the wiring harness receptacle on the towing vehicle.

Trailer, campers and other towed vehicles have been rapidly evolving, and are now more sophisticated and larger in size. These towed vehicles are often equipped with a multitude of more complex accessories, such as towed vehicle electrical braking systems, separate air conditioners, stove and refrigerators, etc. These additional accessories require higher electrical currents and power, which require heavier and greater number of electrical interconnections. Electrical harness connectors having six or seven wires are becoming common on both towing and towed vehicles.

In order to conserve space, these larger and more complex wiring harness connectors are being arranged in circular configurations, resulting in round electrical connectors. These round harness connectors are often adapted for use with pin and/or blade, as well as with male and/or female terminal connectors. Four, six and seven round terminal connectors are now being used in the trailer industry.

Multi-terminal, round style, trailer harness connectors have become more popular in recent years. Since the number of terminals within a given trailer harness varies between vehicles, it is a common occurrence when one wishes to tow a vehicle equipped with a round trailer harness plug which does not mate with the round trailer harness receptacle of the towing vehicle. For example, the towing vehicle harness receptacle has seven terminals and the towed vehicle harness plug has six terminals, or both harnesses have the same number of terminals, but the style or pattern of each harnesses terminals do not match or mate.

Another problem occurs when the terminal pattern of electrical orientation is different between vehicles. If both towing and towed vehicle harnesses have seven terminals, the functional wiring pattern of each harness may not match. For instance, the location of the left turn signal light function terminal of the towing vehicle receptacle may have a different location than that of the appropriate mating terminal on the towed vehicle harness plug. Therefore electrical interface requires the ability to make proper electrical orientation between separate vehicles.

Another problem occurs when attempting to releasably secure a round trailer harness plug into a dissimilar sized towing vehicle round harness receptacle. If the towed vehicle plug diameter is too small, proper securement together can not be achieved.

U.S. Pat. No. 4,781,393 by C. Jeter, issued in Nov. 1, 1988, discloses a trailer light convertor having a conversion box mounted between the towing vehicle and the towed vehicle, wherein jumper adapters are manually moved to adapt to various plug configurations.

U.S. Pat. No. 4,718,853 by R. Orbanic, issued in Jan. 12, 1988, discloses a four pole electrical connector having variably position able switches for selectively connecting various electrical circuits of a first vehicle to corresponding electrical circuits of a second vehicle.

U.S. Pat. No. 5,184,960 by E. Hopkins et al., issued Feb. 9, 1993, discloses a trailer light connection system having a T-shaped connector, utilizing a modularized tap plug.

U.S. Pat. No. 4,842,524 by R. Hopkins et al., issued Jun. 27, 1989, discloses a T-shaped connector for mack lighting systems having three terminals, utilizing a modularized tap plug, with split wire connectors to simplify system installation.

U.S. Pat. No. 4,846,697 by E. Rodgers, issued Jul. 11, 1989, discloses a cable for interconnecting the lighting systems of a towing vehicle and a trailer, utilizing a plurality of individual wire, each with individual wiring connectors, which are manually positioned to match the layout of the incompatible wiring connector.

U.S. Pat. No. 4,770,644 by E. Feder, issued Sep. 13, 1988, is representative of a seven pin disconnectable, multi pole round connector, which requires a complimentary mating connector.

SUMMARY OF THE INVENTION

Therefore, what is needed is an improved wiring harness connector which allows proper electrical orientation when adapting otherwise incompatible round electrical connectors, to provide a unified connector interface adapter apparatus between a towing vehicle and towed vehicle, while also providing a releasable means of securement between dissimilar sized harness connectors.

The unified connector interface adapter apparatus disclosed herein, enables the user to electrically interface together a variety of vehicles having incompatible round wiring harness connector configurations, without requiring the rewiring or replacement of the towing vehicle wiring harness connector receptacle or the rewiring or replacement of the towed vehicle wiring harness connector plug. The unified connector interface adapter provides a complimentary electrical interface between a round towing vehicle multi-terminal harness connector receptacle, with a selected towed vehicle round harness connector plug equipped with a different number of terminals, a like number but dissimilar style or pattern of terminals, a like style and number of terminals but different wiring pattern, or harness connectors with different plug or receptacle diameters.

The unified connector interface adapter apparatus' disclosed herein may also provide additional services to the user such as visual diagnostic illuminators or circuit breakers providing circuit protection and indication of proper electrical orientation. Indicators may include light bulbs or LED's. Circuit breakers may include replaceable fuses, positive temperature co-efficient polymer devices or temperature controlled variable resistive devices.

Other features and advantages of the invention will be apparent from the following description with reference to the accompanying drawings which illustrate by way of non-limiting examples of several embodiments thereof.

DETAILED DESCRIPTION OF THE PREFERRED EMBODIMENTS

Figure 1:
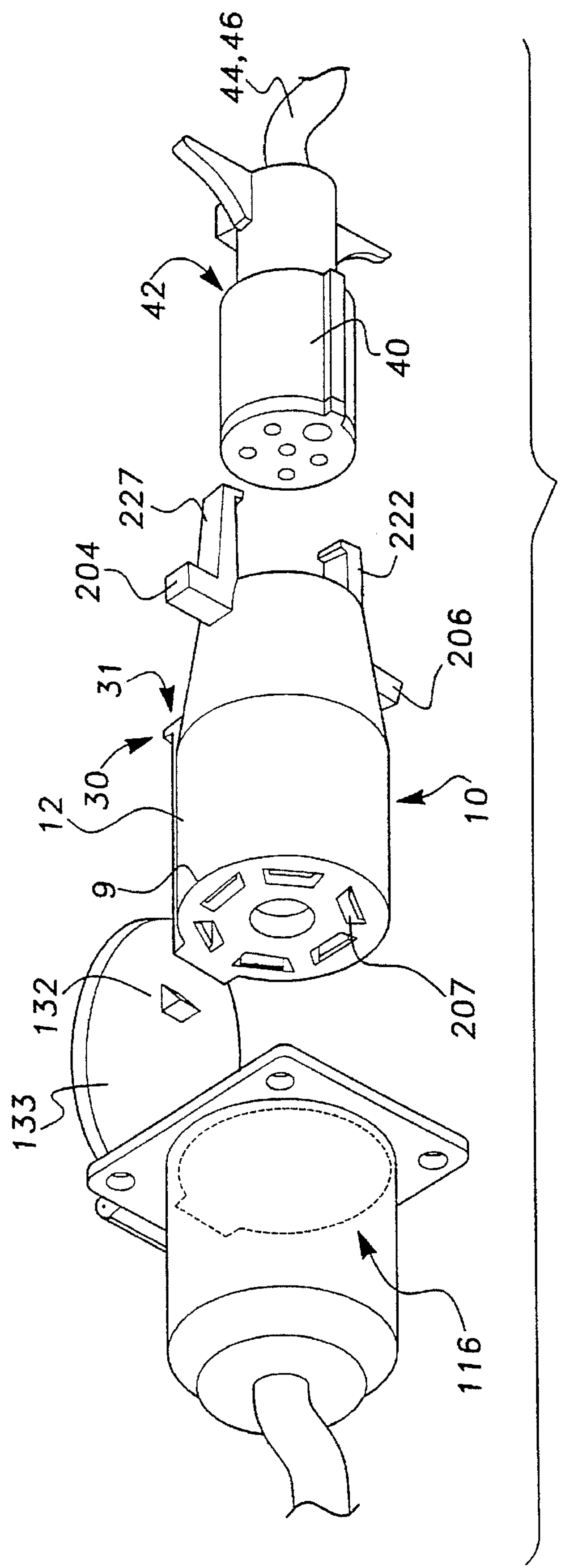
FIG. 1 is a perspective view of a preferred embodiment of the unified connector interface adapter apparatus between a towing vehicle harness receptacle and a towed vehicle harness plug.
Figure 2:
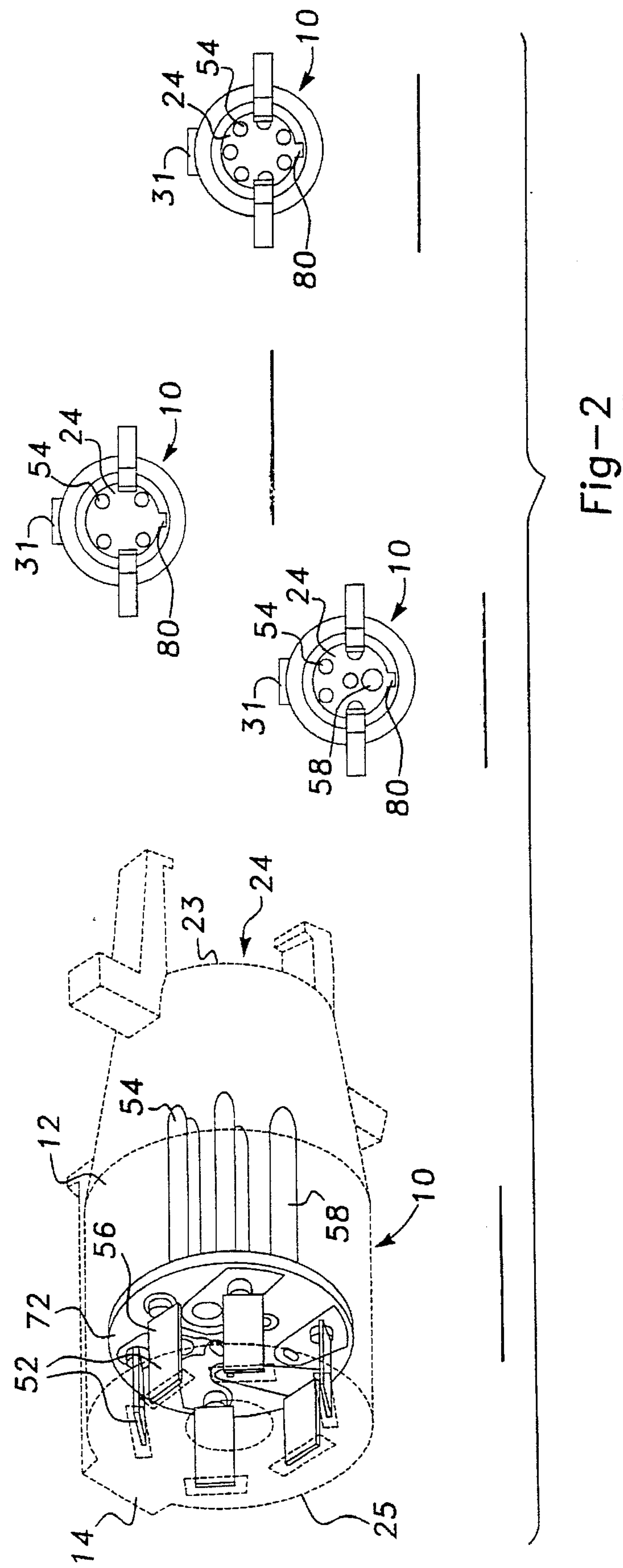
FIG. 2 is a perspective view of a preferred means to provide appropriate corresponding electrical continuity between terminals of towing and towed vehicle harness utilizing a printed circuit board within the housing, and an end view of the unified connector interface apparatus showing a receptacle inside said apparatus housing.

As best shown in FIG. 1 and FIG. 2, the unified connector interface adapter apparatus 10 comprises a housing 12 having a first end 23 and a second end 25. The second end 25 of housing 12 forms a round plug 9 having a flanged portion forming an orientation key 14 so as to allow proper alignment when making electrical engagement with a selective round towing vehicle trailer harness receptacle 116. Receptacle 116, equipped with a locking catch 132 on the inside of it's hinged protective lid 133, releasably secures the unified connector adapter interface apparatus 10 there within when engaged with locking flange 30 directly behind keyed portion 14.

The housing 12 at first end 23 having a round connector receptacle and entryway 24 sized to substantially receive a selected round towed vehicle harness connector plug 40 therein.

Figure 3:
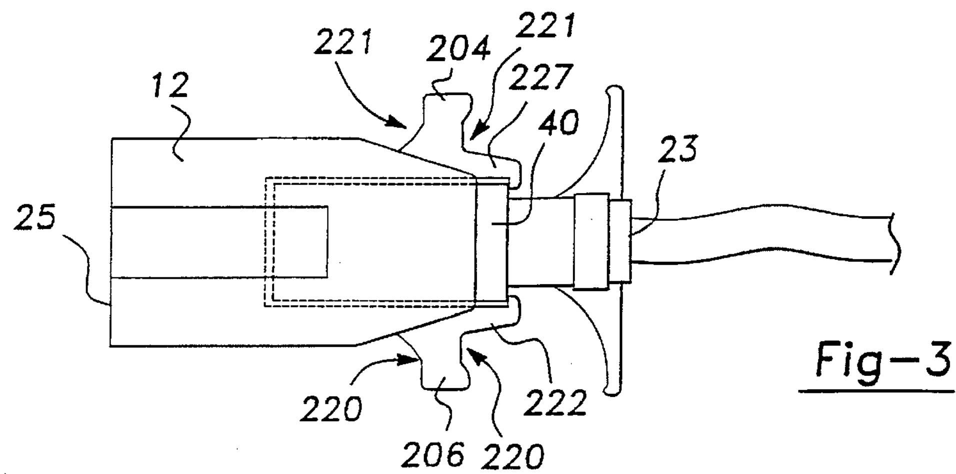
FIG. 3 is a top view of said round towed vehicle harness plug engaged and releasably secured within the said unified connector interface adapter apparatus housing recepticle.
Figure 4:
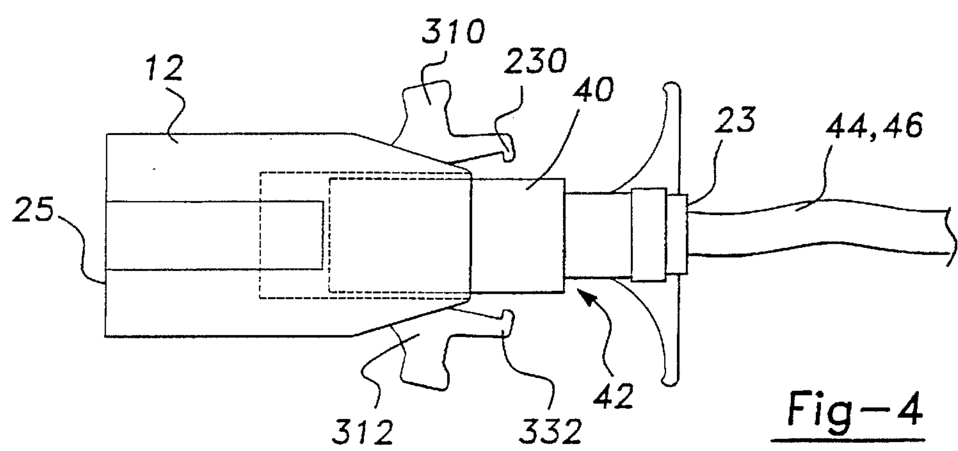
FIG. 4 is a top view of a round towed vehicle harness plug having it's engagement released and partially removed from the unified connector interface adapter apparatus housing receptacle.

As best seen in FIG. 3 and FIG. 4 preferably, in proximity near the first end 23 of housing 12, are two handles 204 and 206, providing finger hold surfaces 221 and 220, extending away from said housing, providing finger placement for user, allowing ease of insertion and removal of unified connector interface adapter apparatus 10 a from round towing vehicle harness receptacle 116. The surfaces 221 and 220 may also provide finger placement for users when inserting and removing a selected round towed vehicle harness connector 40 into and out of unified connector interface adapter apparatus housing 12 of receptacle 24 at first end 23.

Handles 204 and 206 preferably have perpendicular portions extending beyond first and 23 of housing 12 adjacent to receptacle 24 forming latch arms 227 and 222 respectively. In proximity to first end 23 of latch arms 227 and 222 are latches 230 and 232 which provide releasable securement of a towed vehicle round harness connector 40 at securement surface 42 when substantially inserted into receptacle 24.

The shape of the handles 204 and 206 combined with latch arms 227 and 222 respectively form engagement levers 310 and 312 which may be actuated by the user when wishing to remove the towed vehicle harness 40 from receptacle 24. For ease of actuation, it is preferred that the unified connector interface adapter apparatus 10 is made of a semi-flexible dielectric material such as rubber or plastic.

Other means of releasable securement may be utilized such as providing a tighter fit inside receptacle 24 instead of using preferable novel engagement levers disclosed herein without departing from the scope of the following claims.

As best seen in FIG. 1 and FIG. 2, the second end 25 of the unified connector interface adapter apparatus 10 housing 12 includes a plurality of electrical terminals 52 within recessed portions 207 extending within housing 12 which may be either male pins or blades or complementary female receptacles spaced or arranged in a hexagonal or pentagonal or circular configuration or array. For purposes of this disclosure, reference to electrical terminals 52 at second end 25 and electrical terminals 54 inside receptacle 24 of apparatus 10, include pins. blades, female receptacles or other known forms of electrical terminals.

At first end 23 of the inside of hollow receptacle 24 within housing 12 is a plurality of electrical terminals 54 being preferably male terminals arranged in a square, hexagonal, pentagonal or circular array or configuration.

It is also preferred that at lease one electrical terminal 58 has a different size or diameter than the other terminals 54 so as to insure proper electrical orientation with a towed vehicle harness plug 40. In addition, it is preferred that the receptacle 24 has a keyed recessed entry 80 to further allow proper orientation with plug 40.

Although FIG. 2 only illustrates a plurality of six electrical terminals, it is within the scope of this disclosure to include a plurality of round connector configurations, such as four way, five way, eight way, nine way and etc. round connectors. Such plurality of round connector configurations may be readily adapted by one of skill in this art, in accordance with the teaching of this invention, and such plurality of round plug configurations are intended to fall within the scope of the following claims.

Electrical wires 44 preferably in the form of a wiring harness 46, connect the electrical signals generated on the towing vehicle with selected pins or sockets 54 on the unified connector interface adapter apparatus 10 to provide responsive electrical signals on the towed vehicle.

A circuit board 72 having circuitry on at least one side, disposed within the housing, provides electrical continuity between the electrical terminals 52 positioned at second end 25, with the appropriate electrical terminals 54 extending within receptacle 24, as shown in FIG. 2.

Figure 5:
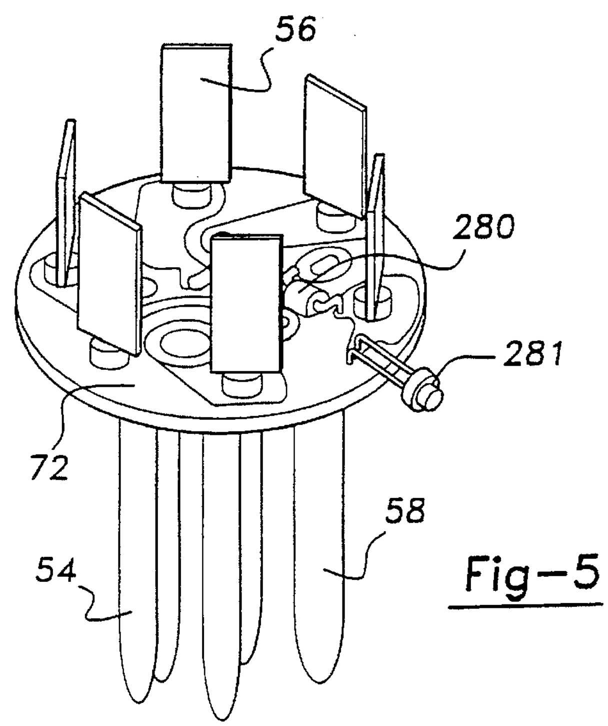
FIG. 5 is a perspective view of a circuit board preferably located within said housing providing electrical continuity with a variety of electrical and electronic components.

As best shown in FIG. 5 circuit board 72 may also include interconnections with other electrical or electronic components such as, but not limited to fuses or solid state electronic current limiters utilizing transistors, varistors, or variable resistive polymer devices 280, providing circuit protection.

In addition, circuit board 72 may also include electrical interface with visual diagnostic illuminators such as light bulbs or LED's 281.

Thus, while the novel unified connector interface adapter apparatus has been fully disclosed and described herein, numerous modifications and adaptations will become readily apparent to one of ordinary skill in this art, and such adaptations and modifications are intended to be included within the scope of the following claims.

I claim:

1. A unified connector interface adapter apparatus, comprising:

a.) a molded one-piece dielectric electrical connector housing having a first end and a second end;

b.) said second end of said housing forming a plug having an end face with openings therein and terminals recessed from respective ones of said openings, said terminals being oriented in a generally square, hexagonal, pentagonal or circular configuration;

c.) said first end forming a hollow receptacle adapted to receive therein a mating connector;

d.) said receptacle having a plurality of electrical terminals therein oriented in a generally square, hexagonal, pentagonal or circular configuration;

e.) electrical circuitry located within said housing to interconnect the electrical terminals located at said first end with respective ones of said terminals at said second end;

f.) said adapter apparatus adapted to mate with other electrical connectors only at said first and second ends.

2. The unified connector interface adapter apparatus of claim 1, wherein said receptacle comprises at least one resilient latch arm extending beyond said first end of said housing to retain the mating connector in said receptacle.

3. The unified connector interface adapter apparatus of claim 1, wherein the electrical circuitry comprises a printed circuit board having circuitry on at least one side.

4. The unified connector interface adapter apparatus of claim 1, wherein, said electrical circuitry within said housing includes at least one visual diagnostic illuminator.

5. The unified connector interface adapter apparatus of claim 1, wherein, said electrical circuitry within said housing includes at least one circuit breaker, positive temperature co-efficient polymer device, or temperature controlled variable resistive device.

* * * * *